Sept. 20, 1938.   N. MILLER   2,130,889
TEMPERATURE CONTROL DEVICE
Filed May 24, 1935
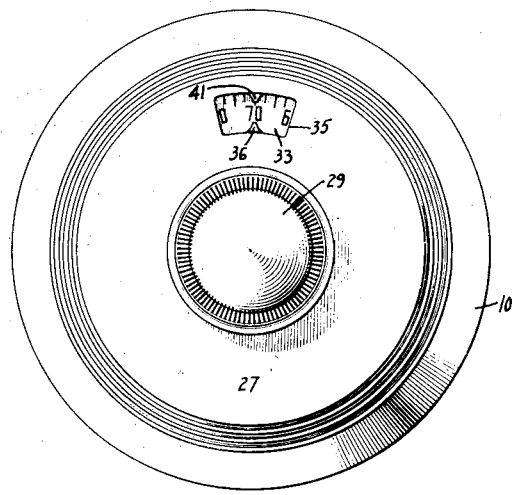
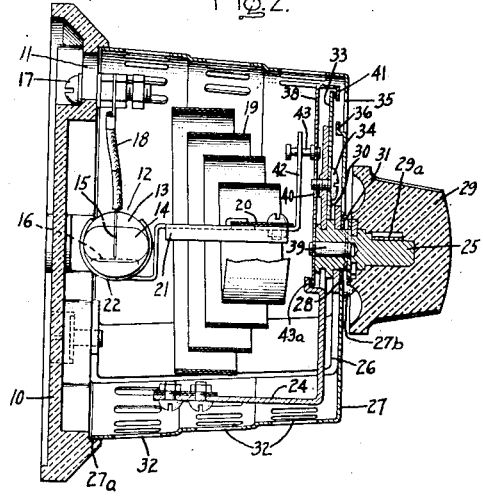
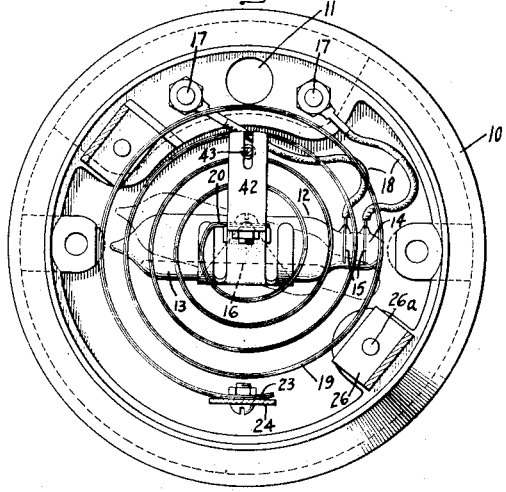
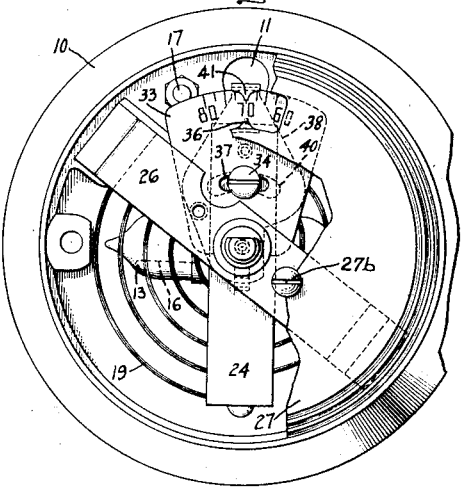
Inventor:
Nicholas Miller,
by Harry E. Dunham
His Attorney.

Patented Sept. 20, 1938

2,130,889

UNITED STATES PATENT OFFICE 2,130,889

TEMPERATURE CONTROL DEVICE

Nicholas Miller, La Grange, Ill., assignor to Edison General Electric Appliance Company, Chicago, Ill., a corporation of New York Application May 24, 1935, Serial No. 23,195

2 Claims. (Cl. 200—139)

This invention relates to temperature control devices, and it has for its object the provision of an improved device of this character.

Although not limited thereto, this invention relates more specifically to means for opening and closing an electric circuit in response to temperature changes, such as the heating circuit of a heating system, or a controlling circuit for the heating circuit of a heating system. For example, the invention is quite suitable as a room thermostat for controlling the central heating plant of a building; to control electric range ovens; electric fry kettles; etc.

In one of its aspects, this invention contemplates the provision of improved means for controlling temperature, and also for indicating at all times the instantaneous values of the temperature of the controlled medium, or device, such as the air of a room in which the controlling means is located and whose temperature is being controlled.

In accordance with this invention, a single temperature responsive element is used to control a heating circuit and also to operate suitable means for indicating the temperature of the controlled medium. More specifically, a suitable temperature responsive element is arranged to control the operation of a control member, such as a switch. Means are provided for adjusting the temperature responsive means so as to hold a preselected temperature, and temperature indicating means are provided including a dial operated by the adjusting means to denote the temperature selected. In addition, a suitable indicating member cooperates with the dial and is driven by the temperature responsive means to indicate the instantaneous values of the temperature of the controlled medium.

For a more complete understanding of this invention, reference should be had to the accompanying drawing in which Fig. 1 is a front elevation of a temperature control device embodying this invention; Fig. 2 is a vertical central sectional view of the temperature control device shown in Fig. 1; Fig. 3 is a front elevation of the temperature control device shown in Figs. 1 and 2 with portions removed and portions shown in section so as to illustrate certain details of construction; and Fig. 4 is a fragmentary front elevation with portions broken away so as to illustrate certain details of construction.

Referring to the drawing, this invention has been shown as applied to a room thermostat intended to control the central heating system of a house wherein an electrical control circuit for the heating plant is provided controlled in accordance with the temperature of a room. As pointed out previously, this invention is not limited to room thermostats, but is applicable to the control of heating systems in general, such as the heating means for an electrically heated bake oven, fry kettle, etc.

As shown in the drawing, the temperature control device comprises a base 10 formed of a suitable electrically insulating material, such as a phenol condensation product. The base 10, as shown, is substantially circular in form, and at its upper end is provided with an aperture 11 for the reception of a screw or other suitable means whereby it may be suspended on the wall of a room. The base 10 functions to support all the elements of the temperature control device.

The control member of the control device consists in a suitable switch 12, which, as shown, is of the fluent type. The switch comprises a closed tube 13 having an extension 14 of reduced diameter at one end, as clearly shown in Fig. 3. Within the extension 14 of reduced diameter there are positioned a pair of electrodes 15 spaced apart longitudinally of the axis of the tube 13 and arranged substantially at right angles to this axis. Within the tube 13 there is placed a pool 16 of a fluid metal having good electrical conductivity, such as mercury. When the tube is in a horizontal position, as shown in Figs. 2, 3 and 4, the mercury pool will be in the main portion of the tube and will not contact the electrodes 15, whereby the switch will be open, that is, the circuit through the switch will not be closed. However, when the tube is tilted in a clockwise direction, as for example, to the dotted line position shown in Fig. 3, the mercury will flow into the reduced extension 14 to engage both of the electrodes 15 and thereby complete a circuit through the switch.

The electrodes 15 are electrically connected to binding posts 17 by means of flexible electrical conductors 18. It will be understood that the binding posts will be electrically connected in the heating circuit to be controlled, or will be connected in a controlling circuit for the heating circuit, so that when the switch 12 is opened, the heat generating plant or means will not be activated to supply heat, whereas when the switch is closed, the heating circuit will be energized, or the controlling circuit for the heating plant will be energized, to cause the heating means to be activated to supply heat.

The angular position of the tube 13 is controlled by means of a temperature responsive element 19. As shown, the temperature responsive element 19 is formed of a bimetallic strip wound into spiral form with the turns lying substantially one above the other. The bimetallic strip is formed of two metals, having dissimilar temperature coefficients of expansion, such as invar and brass, the two strips being securely welded together lengthwise. The inner end 20 of the spiral supports a bracket 21 arranged substantially in the axis of the spiral, as shown in the drawing. The member 21 carries on one end, its left hand end as viewed in Fig. 2, a clip member 22 which embraces the tube 13 so as to support the switch.

The outer end 23 of the temperature responsive element is secured to a supporting member 24 provided for the element. The supporting member 24, as shown, has a substantially right angle shape, the lower leg of which is secured directly to the outer end 23 of the element 19. The other leg arranged substantially at right angles to the lower leg extends in substantially parallel relation with the base 10 and is rigidly secured to a stud 25. The stud 25 in turn is mounted in a rigid support 26 of substantially U-shape. The legs of this support are rigidly secured to the base 10 by means of screw fastening means 26a. A cup-shaped casing 27 houses the elements of the temperature control device. The mouth of the casing is received in a suitable recess 27a provided for it in the base 10, and is secured to the support 26 by means of screws 27b. The stud 25, as shown, protrudes through an opening 28 provided for it in the outer wall of the casing 27 and to the protrudnig end of the stud there is secured an adjusting knob 29. This knob, as shown, is rigidly secured to the stud by means of a key 29a. The stud is provided with a collar 30 which bears against the inner surface of the support 26, while on the outside of the support there is provided a spring washer 31 interposed between the adjusting knob 29 and the support. The spring washer causes the collar 30 to engage the support with a frictional force sufficiently great to hold the support 24, and the spiral thermostat 19 associated therewith, in the adjusted position effected by the knob 29.

In view of the foregoing, it will be observed that the position of the thermostatic element 19 and consequently that of the switch 12 will depend upon the adjustment of the knob 29.

The casing 27 is provided in its side walls with a plurality of rows of spaced apertures 32 extending throughout the complete circumference of the casing. As shown, there are three rows of apertures 32 spaced at intervals longitudinally of the casing. These apertures provide for a free circulation of air over and about the thermostatic element 19. For example, if the casing 10 be suspended from the wall of a room, the thermostatic element 19 will for all practical purposes be immersed in the atmosphere in the room whose temperature is being controlled, or in other words, will be subjected directly to the temperature of the controlled medium.

It will be clear in view of the foregoing construction that the position of the switch 12 will control the heating action of the heating plant. When the tubular member 13 is horizontal, as shown in Figs. 3 and 4, or is moved in a counter-clockwise direction from this position, the switch will be opened and heat will not be applied to the room; on the other hand, when the tube is inclined, in a clockwise direction, as shown in Fig. 3, heat will be applied to the room, and will be continuously applied to the room until the switch returns substantially to its horizontal position when the switch will be opened. Thus, when the control knob 29 operates to adjust the position of the carrier 24 and the element 19, it will at the same time adjust the position of the tubular member 13 to control the action of the switch.

In order to assist in adjusting the temperature setting of the device, a suitable temperature indicating dial 33 is provided. The dial 33 is rigidly secured to the upright arm of the support 24 by means of screw fastening means 34. A suitable window 35 is provided in the front wall of the casing 27 through which the dial may be observed. At the base of the window, there is provided an index 36 which cooperates with the dial to denote the temperature setting of the knob. It will be observed that the dial is provided with temperature graduations; in this case, the dial is provided with the numerals 60, 70 and 80 denoting temperatures, spaced a proper distance apart, and with suitable sub-dividing lines, whereby the observer may more accurately set the device. The dial 33 is provided with an arcuate shaped slot 37 for receiving the screw fastening means 34 to provide for adjustment of the dial when calibrating the control device. It will be observed in view of this construction that when the knob 29 is rotated so as to rotate the support 24 it will at the same time move the dial 33 which is attached to the support. The selected temperature will appear opposite the index 36.

The bimetallic element 19 not only functions to operate the switch, but also operates a suitable indicating device to denote the instantaneous values of the ambient temperature in the room. For this purpose, a suitable indicator 38 is provided. The indicator 38, as shown, is pivotally mounted upon a shaft 39, which in turn is mounted in the axis of the stud 25 in an aperture provided for it in the stud. The indicator is arranged to rotate freely on the shaft 39 with reference to the stud 25. The indicator 38, as shown, extends upwardly in substantially parallel relation with the upright arm of the support 24 and the dial 33, and is provided with an arcuate-shaped slot 40 to receive the projecting end of the screw 34. At the top, the indicator 38 is provided with a portion arranged at right angles to the upright part and extending over the dial 33. This portion carries on its outer end a depending index 41 which cooperates with the indications on the dial 33. The indicating arm 38 is operated by means of an arm 42, which, as shown, is rigidly secured to the inner end 20 of the temperature responsive element 19. The upper end of this member 42 is provided with a fork which receives a pin 43 secured to the indicator arm. The indicator arm 38 is prevented from moving axially from the stud 25 by means of a lip 43a on the support 24.

In the operation of the temperature control device, the knob 29 is adjusted to the temperature it is desired to hold in the room. For example, assume that the knob 29 has been set to a temperature of 70° F. In this case, as long as the temperature of the room is 70° F., the temperature responsive element 19 will hold the tube 13 in a horizontal position whereby the switch will be opened. However, in the event that the temperature should fall below 70° F., the bimetallic element will incline the tube 13 to close the switch and cause the heating plant to supply heat to the room. As the temperature of the room rises, the temperature responsive element will gradually "unwind" so as to return the tube to its horizontal position and when the temperature of 70° F. has been attained, will move the tube to open the switch. In this manner, the bimetallic spiral functions to hold a predetermined temperature which is a mean between the minimum and maximum temperatures at which it functions to close and open the switch, the particular temperature that is held being determined by the adjustment of the knob 29.

Should the knob 29 be turned to a higher temperature position, such as 75° F., the support 24 and bimetallic element will be rotated in a clockwise direction from their positions shown in Figs. 3 and 4, and the tube 13 will also be inclined to the horizontal. This will close the switch to cause heat to be applied to the room until its temperature reaches 75° at which temperature the switch is turned off by the spiral 19. If a lower temperature is desired, the knob 29 is adjusted to move the switch 12 in a counter-clockwise direction to a suitable position. In this case, the room will cool to a predetermined low temperature below the selected temperature before the spiral will operate to close the switch to apply heat to the room, after which the spiral will operate, as before, to hold the lower selected temperature.

In any position of the control knob 29, the switch will be alternated between its on and off positions so as to hold a mean temperature between the temperature at which the switch is turned on and the temperature at which it is turned off.

At all times, the index 41 carried by the indicator arm 38 indicates the ambient temperature on the dial 33. When the knob 29 is adjusted to change the temperature setting of the device by moving the temperature responsive element 19, the switch 12 and the dial 33, the indicator arm 38 will also be moved as a unit with these elements to the new position, but will always register the ambient temperature of the element 19 on the dial. As the element 19 operates the switch to control the supply of heat to the room, the index 41 will be moved with it so as to indicate at every instant of time, the ambient temperature of the element 19.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A temperature control device comprising a perforated casing having a front wall, a spiral temperature responsive member in said casing positioned so that air circulating through said perforations freely passes over said temperature responsive member, a support in said casing for said temperature responsive member connected to one end thereof and mounted for movement substantially on the central axis of said casing, a control shaft mounted in the front wall of said casing substantially in the central axis thereof connected at its inner end to said support and having a control knob on its outer end, a temperature indicating dial within said casing and said front wall having a window for viewing the dial, a fixed index in said window cooperating with said dial, an indicator within said casing associated with said dial, a driving connection between the other end of said spiral temperature responsive member and said indicator so that said indicator denotes the temperature of said spiral member on said dial, and a switch operated by said other end of said spiral member.

2. A temperature control device comprising a base, a perforated casing secured to said base and projecting from one side thereof, a support also mounted on said base, a spiral bimetallic thermostat within said casing so that air circulating through said perforations of said casing passes freely around and about said thermostat, an arm within said casing secured to the outer end of said thermostat to support said thermostat in said casing, a stud on said support mounting said arm for pivotal movement on said support protruding from said casing, an adjusting knob on the exterior of said casing secured to said protruding portion whereby the position of said arm and said thermostat can be adjusted, a tubular vessel rigidly secured to the inner end of said thermostat, contacts in said vessel, a conducting fluid in said vessel arranged to engage said contacts to complete a circuit through them and to disengage said contacts to break said circuit depending on the angular position of said vessel, said thermostat controlling said position of said vessel to close and open said contacts, a temperature indicating dial within said casing secured to said stud so as to be adjusted by said knob when said thermostat is adjusted, said casing being provided with a window through which said dial is observable and an index cooperating with said dial to denote its temperature setting, an indicator, a shaft mounted within the axis of said stud supporting said indicator for free rotation with reference to said stud and for cooperation with said dial to denote ambient temperature and a driving connection between said inner end of said thermostat and said indicator.

NICHOLAS MILLER.